(12) United States Patent
Kinder et al.

(10) Patent No.: US 7,338,137 B2
(45) Date of Patent: Mar. 4, 2008

(54) METHOD AND SYSTEM FOR ASSISTING THE DRIVEAWAY OF A MOTOR VEHICLE

(75) Inventors: Ralf Kinder, Eitelborn (DE); Gerhard Klapper, Boppard (DE); Reza Shokoufandeh, Coventry (GB); Franz-Josef Endres, Sessenhause (DE); Ralf Leiter, Vallendar (DE); Lorenz Maack, Böblingen (DE); Andreas Söns, Grafenau (DE); Gregor Poertzgen, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 11/249,729

(22) Filed: Oct. 13, 2005

(65) Prior Publication Data
US 2006/0131957 A1 Jun. 22, 2006

Related U.S. Application Data

(63) Continuation-in-part of application No. 10/464,283, filed on Jun. 18, 2003, now abandoned, which is a continuation of application No. PCT/EP01/14947, filed on Dec. 18, 2001.

(30) Foreign Application Priority Data
Dec. 18, 2000 (DE) ................. 100 63 061

(51) Int. Cl.
*B60T 8/32* (2006.01)
(52) U.S. Cl. .................. 303/191; 303/192; 188/DIG. 2
(58) Field of Classification Search ........... 303/191, 303/192, 194; 188/DIG. 2; 192/13 A
See application file for complete search history.

(56) References Cited

U.S. PATENT DOCUMENTS

| 4,717,207 | A | 1/1988 | Kubota et al. |
| 5,916,062 | A | 6/1999 | Siepker |
| 6,530,450 | B2 | 3/2003 | DeLuca et al. |
| 2002/0033642 | A1 | 3/2002 | Holl |
| 2003/0214185 | A1 | 11/2003 | Kinder et al. |

FOREIGN PATENT DOCUMENTS

| DE | 24 20 252 | 10/1975 |
| DE | 36 18 532 | 12/1986 |
| DE | 198 49 799 | 6/2000 |
| DE | 199 17 437 | 10/2000 |
| DE | 199 25 249 | 12/2000 |
| EP | 0 822 129 | 2/1998 |

*Primary Examiner*—Bradley King
(74) *Attorney, Agent, or Firm*—MacMillan, Sobanski & Todd, LLC

(57) ABSTRACT

The present invention provides driveaway assistance for a motor vehicle having braking equipment which, in the standstill condition of the motor vehicle, automatically or under the control of a vehicle driver summons up braking forces needed for the standstill condition. To assist start-up (driveaway) of the motor vehicle through a reduction of the braking forces generated in the standstill condition, a driveaway request or a vehicle driver is determined when defined conditions, which are to be met for driveaway of the motor vehicle, exist in the standstill condition. Once a driveaway request has been recognized, the operating state of the motor vehicle is checked until an operating condition required for driveaway exists. Once such an operating condition is reached, the braking equipment of the motor vehicle is controlled in such a way that its braking forces generated in the standstill condition are reduced to allow driveaway of the vehicle.

30 Claims, 7 Drawing Sheets

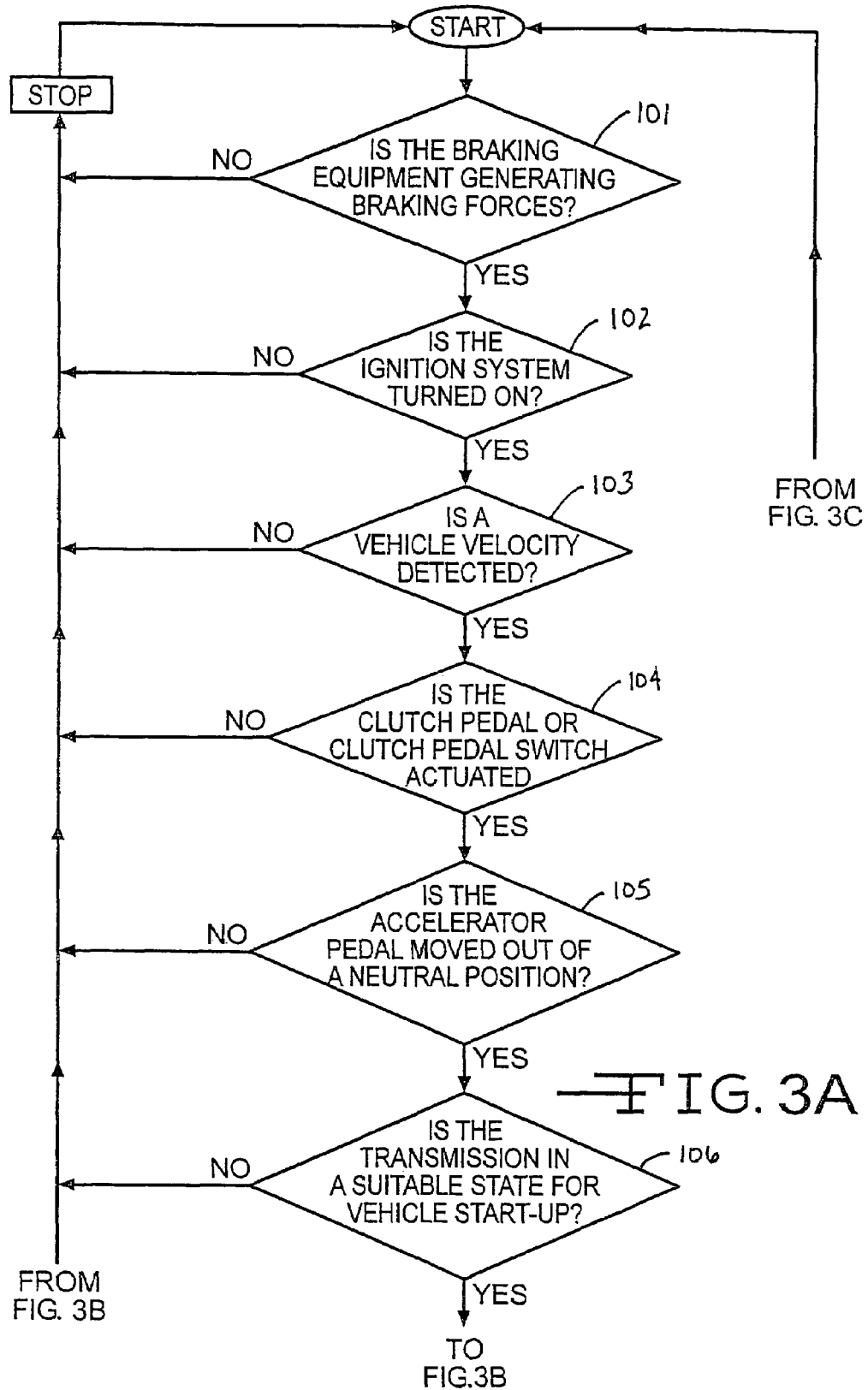

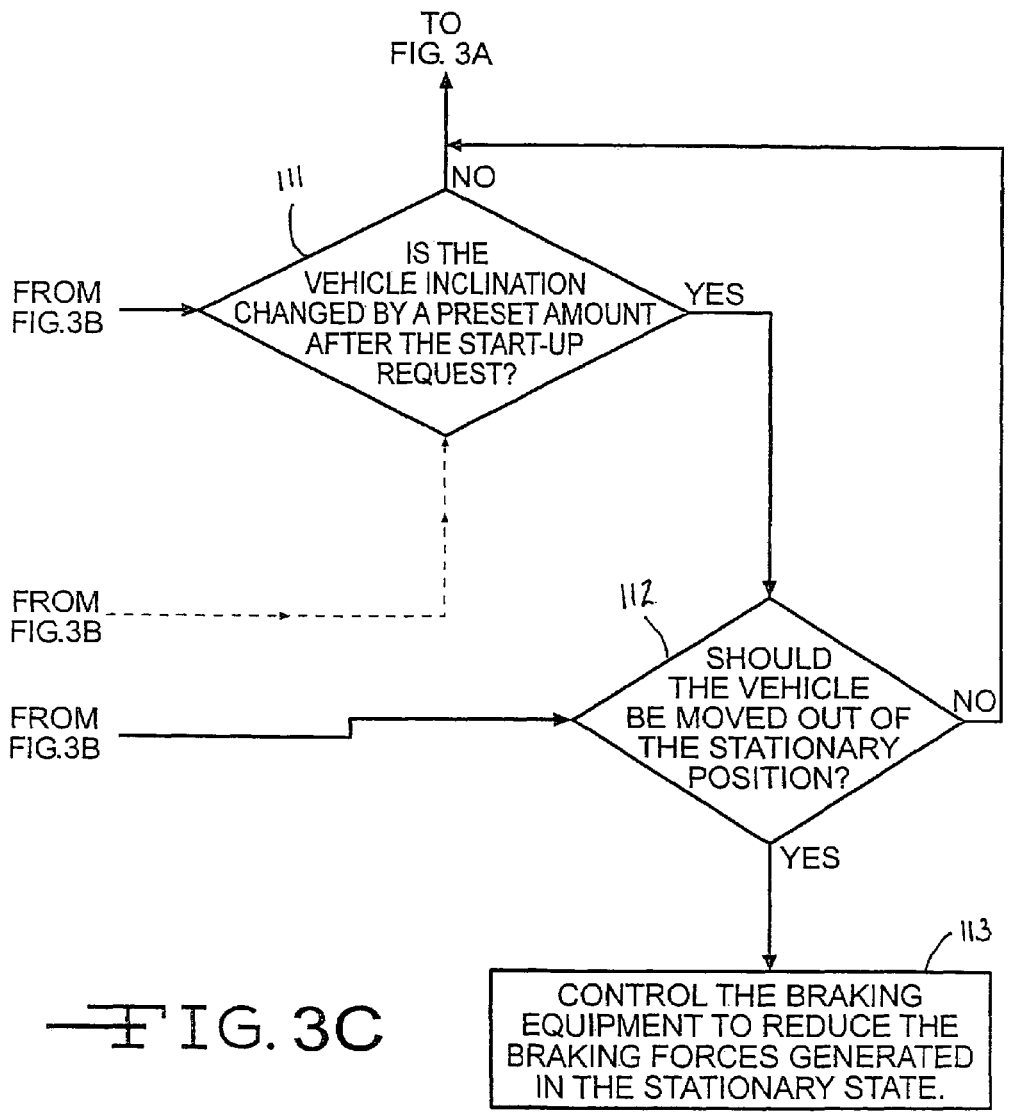

METHOD AND SYSTEM FOR ASSISTING THE DRIVEAWAY OF A MOTOR VEHICLE

CROSS REFERENCE TO RELATED APPLICATIONS

This application is a Continuation-In-Part of U.S. patent application Ser. No. 10/464,283 filed Jun. 18, 2003 now abandoned, the disclosures of which are incorporated herein by reference, which was a Continuation of International Application No. PCT/EP01/14947 filed Dec. 18, 2001, the disclosures of which are incorporated herein by reference, and which claimed priority to German Patent Application No. 100 63 061.8 filed Dec. 18, 2000, the disclosures of which are incorporated herein by reference.

The present invention relates to a method and a system for assisting the start-up (initial movement) of a motor vehicle. In particular, the present invention relates to a method and a system which during driveaway of a motor vehicle control braking equipment, which is activated in the standstill condition of the motor vehicle (i.e., when the vehicle is stationary), so as to assist and allow the driveaway, that is to say, the driving of the vehicle away from the stopped location and transition into the driving condition (operating state).

BACKGROUND OF THE INVENTION

The braking equipment or parts of the braking equipment of a motor vehicle are usually operated also in the standstill condition of the motor vehicle in order to maintain the standstill condition of the latter. Generally, for this purpose use is made of a parking brake, which is typically actuated by a vehicle driver, or of braking equipment which in a controlled manner generates braking forces required for the standstill condition.

To start up the motor vehicle, it is necessary to reduce the braking forces generated in the standstill condition.

In the case of conventional parking brakes (hand brakes) which are to be operated by a vehicle driver, it is necessary for the vehicle driver to take not only the measures required for starting up (initial movement or driveaway) but also measures to release the parking brake.

For assisting a vehicle driver during start-up (driveaway) of a motor vehicle it is known from DE-OS-24 20 252 to deactivate the parking brake of a motor vehicle in dependence upon a position of an accelerator pedal. In this case, the parking brake, which in the standstill condition generates a permanently defined braking force, is deactivated to reduce the permanently defined braking force as soon as the accelerator pedal is actuated. This has the result that the parking brake is released even when an actuation of the accelerator pedal does not lead to an driving condition of the motor vehicle which is necessary for driveaway. This is the case, for example, when the vehicle is not started, the engine speed occasioned by the actuation of the accelerator pedal or the engine torque is insufficient to move the vehicle, and the like. Thus, the known parking brake may lead to an unwanted release or to a release of the parking brake which makes it necessary for the vehicle driver during driveaway of the motor vehicle to take additional measures to avoid undesirable driving states.

From DE 36 18 532 A1, and corresponding U.S. Pat. No. 4,717,207, both of which are incorporated by reference herein, driveaway assistance for a motor vehicle on an ascending gradient is known. In this case, a brake system comprises a valve, which is disposed between the master brake cylinder and the wheel brake cylinders and which is closed in the standstill condition to maintain a brake-actuating pressure and opened to cancel the brake-actuating pressure and allow driveaway of the motor vehicle. When the motor vehicle is to be brought from the standstill condition into a driving condition, the engine torque defined by a vehicle driver is checked to see whether it corresponds to a starting torque required for driveaway. In this case, the required starting torque is determined in dependence upon a current angle of inclination of the vehicle on an ascending gradient and upon the vehicle weight. This procedure has the drawback that the current engine torque, even when it corresponds to the required starting torque, does not provide any reliable indication about whether the motor vehicle is actually in a driving state required for driveaway. This is the case, for example, when the clutch is actuated or no gear is selected. When in such cases the required starting torque is reached, the brake system is nevertheless deactivated with the result that an undesirable movement of the motor vehicle may occur.

In the case of this driveaway assistance it is alternatively provided that torques acting upon driving wheels of the motor vehicle be detected. When torques acting upon the driving wheels are high enough to overcome the braking torques generated by the wheel brake cylinders and the backward rolling torque caused by an ascending gradient, the valve is opened to cancel the brake-actuating pressure generated in the standstill condition. This has the drawback that, while the torques of the driving wheels needed to open the valve are sufficient to keep the vehicle stationary particularly on an ascending gradient, they are not high enough actually to bring the motor vehicle from the standstill condition to a driving condition. A further drawback is that this procedure does not check whether the torques acting upon the driving wheels are generated by the engine or are attributable to other causes. Such situations where torques not generated by the engine act upon the driving wheels may arise, for example, when the motor vehicle situated on an ascending gradient is laden.

A general drawback of this driveaway assistance is that the reduction—occasioned by opening of the valve—of braking forces summoned up in the standstill condition is effected independently of the manner in which the motor vehicle is to be moved out of the standstill condition. This may lead to uncomfortable, jerky driveaway phases, during which it may be necessary for the driver to take additional measures to achieve driveaway of the motor vehicle in a desired manner.

SUMMARY OF THE INVENTION

One of the objects of the present invention is to provide a method and a system for assisting the driveaway of a motor vehicle having braking equipment activated in the standstill condition, which method and system assist and render more comfortable the transitions from a stationary to a driving condition, wherein the previously described drawbacks of prior art are overcome.

To achieve this object, the invention provides a method of assisting the driveaway of a motor vehicle, the braking equipment of which is activated in the standstill condition in a controlled manner, automatically or by a vehicle driver and may be deactivated in a controllable manner without any activity on the part of the vehicle driver. In the method according to the invention parameters are determined, which characterize a motor vehicle driving condition, in which the motor vehicle is to be moved from the standstill condition.

Determination of the so-called starting or driveaway parameters is used to recognize a starting request, which is defined by a vehicle driver or, in the case of an automatic vehicle controller ("autopilot"), by a vehicle control system.

Once a starting request has been recognized, current operating conditions (or states) of the motor vehicle are determined until an operating condition is determined, which actually allows a transition from the stationary to a driving condition. In particular, during this process a check is made for the existence of an driving condition, which is caused by an active connection between the vehicle engine and one or more driving wheels.

The braking equipment and, in particular, parking brakes of the motor vehicle are subsequently controlled in such a way that the braking forces generated in the standstill condition are reduced in order to allow the desired transition from the standstill condition to a driving condition.

Preferably parameters are defined, which define for the motor vehicle in the standstill condition and in the driving condition, which has to exist before the motor vehicle may be moved at all out of the standstill condition. Prior to recognition of the starting request, parameters characterizing current operating conditions of the motor vehicle are acquired in the standstill condition in order to check whether the defined initial operating state exists. If this is the case, the driveaway parameters are determined.

For defining the initial operating condition, use may be made of parameters which indicate whether an ignition system of the motor vehicle is switched on, i.e., the vehicle engine has been started or is in a state enabling it to be started, e.g., through actuation of an accelerator pedal or under the control of a vehicle controller, and/or the velocity of the motor vehicle is zero, and/or the braking equipment has been activated in such a way that it generates the braking forces needed for the standstill condition existing at such time.

It is further provided that, as an initial operating condition, an driving condition of the motor vehicle is defined, in which a clutch or a clutch switch has been actuated. Generally, the actuation of the clutch is used for a motor vehicle having a conventional shift transmission, while the switching state of a clutch switch is taken as a basis for motor vehicles having automatic or semi-automatic transmissions.

During determination of the driveaway parameters for recognizing the starting request, it is provided that a check is made to ascertain whether the accelerator pedal has been actuated, an accelerator switch, if provided, has been activated, movements of the accelerator pedal exist, the current rotational speed of the engine is higher than a rotational speed defined for idling of the engine, the desired engine torque, i.e., the engine torque defined in response to an actuation of the accelerator pedal, is higher than the current engine torque, the current engine torque is higher than an engine torque defined for no-load operation, and/or changes of the engine torque exist.

The driveaway parameters are preferably determined until at least one of the driveaway parameters characterizes an driving condition, which differs from an of the motor vehicle in the standstill condition. With regard to the previously described driveaway parameters it is, for example, possible to recognize a starting request when the accelerator pedal has been actuated, the current engine speed is higher than the idling speed, the engine torque defined in response to the starting request is higher than the current engine torque and the current engine torque is higher the no-load engine torque.

To ascertain the existence of the operating state, in which the motor vehicle may actually be moved from the standstill condition, it is provided that the current engine torque, changes of the engine torque and/or of the desired engine torque, and/or time-averaged changes of the engine torque are acquired. In this case, the current engine torque is compared with a combination (e.g., sum, product) of the defined no-load engine torque and a correction factor. The correction factor is used to take account of parameters, which may influence driveaway phases for the motor vehicle, such as e.g., the vehicle weight. It may moreover be checked whether the engine torque and/or the desired engine torque are increasing. It may moreover be determined whether the current, time-averaged change of the engine torque during a defined period of time (e.g., 400 milliseconds) lies within a predefined range (e.g., 1%-60%).

Alternatively or additionally, when determining the current operating conditions the inclination or changes of inclination of the motor vehicle may be acquired. If the current vehicle inclination has changed by a predetermined value (e.g., 5%) relative to the vehicle inclination in the standstill condition or if changes of the vehicle inclination are detected, which do not occur in the standstill condition, a driving condition exists, which allows the motor vehicle to be actually movable out of the standstill condition.

The procedure for the previously described determination of current operating conditions is based on a recognition of a reaction of the engine to the biting of the clutch (i.e., change of gradient of the engine speed curve) with a simultaneous increase of the engine torque and/or a recognition of movements of the motor vehicle in response to forces transmitted from the engine to the driving wheels ("dipping" of the motor vehicle).

The braking equipment is preferably activated to reduce the braking forces generated in the standstill condition when the parameters required for the initial operating state, the parameters required for recognition of the starting request and/or the parameters for the operating state allowing a transition from the standstill condition to a driving condition exist over suitably defined periods of time.

On the basis of the quantities acquired for the initial operating state, the starting request and the driveaway operating condition it is possible to control the brake system so as to reduce the braking forces, which are provided in the standstill condition, in dependence upon one or more of these parameters. In this manner the reduction of the braking forces is adapted to the respective operating state of the motor vehicle and/or to the respective recognized starting request.

When controlling the braking equipment for leaving the standstill condition it is further provided that the motor vehicle is controlled in such a manner that driveaway takes place as jerk-free as possible and without increased strain on or damage of the braking equipment, in particular the brake linings. For controlling the operating conditions of the motor vehicle occurring during control of the braking equipment, it is possible to resort to already existing systems, such as an engine management system. The control of the motor vehicle may during the control of the braking equipment for leaving the standstill condition take place in dependence upon an operating condition of the braking equipment in the standstill condition, the detected driveaway parameters, the detected current operating condition in the state of driveaway, and a current operating condition during the control of the braking equipment.

Preferably the engine speed and/or the engine torque are controlled during the control of the operating conditions of the motor vehicle during driveaway. It is possible in this case that the engine speed and/or the engine torque is/are reduced at least for a short period of time during driveaway if the braking equipment still generates braking forces preventing an actual starting of the motor vehicle. The engine speed and/or engine torque can be increased, for example in response to the chronological order of the effective braking forces while controlling the braking equipment, so that the standstill condition can be left. In particular, engine speed and/or engine torque can be controlled in such a manner that an undesired movement of the motor vehicle (rolling away) is prevented during control of the braking equipment. Increase of the engine speed and/or engine torque may be effected abruptly, linearly, in steps or according to another function that effects a driveaway comfortable to the driver and avoids increased strain on or damages of the brake linings.

The invention further provides a system for assisting the driveaway of a motor vehicle, which is held in the standstill condition by braking equipment activated in the standstill condition. The system according to the invention comprises a control device as well as a plurality of detection devices (sensors) for acquiring parameters, which characterize operating conditions of the motor vehicle, and an interface for controlling the braking equipment, wherein the control device is operated using one of the previously described methods.

In addition, the invention provides a computer program product that comprises program code portions allowing it to carry out the above method steps.

Various objects and advantages of this invention will become apparent to those skilled in the art from the following detailed description of the preferred embodiment, when read in light of the accompanying drawings.

DETAILED DESCRIPTION OF THE INVENTION

Figure 1:
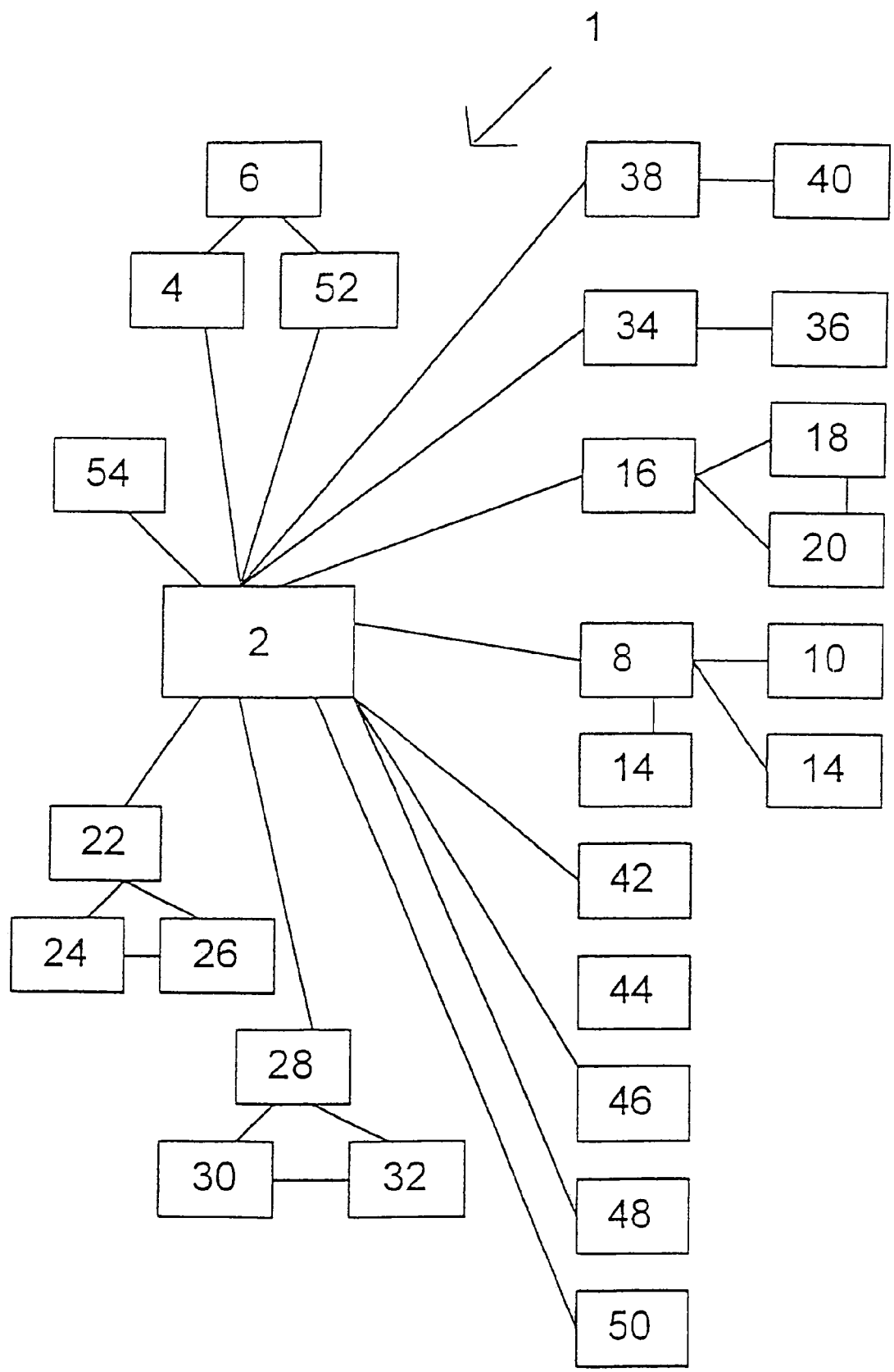
FIG. 1 a diagrammatic view of a system according to the invention for assisting the driveaway of a motor vehicle, FIGS. 2A, 2B, and 2C a flowchart of an embodiment of a method according to the invention for assisting start-up, and FIGS. 3A, 3B, and 3C a flowchart of a further embodiment of a method according to the invention for assisting driveaway.

The driveaway assistance system 1 illustrated in FIG. 1 may be a separately constructed device of a motor vehicle, use at least partially already existent components of further systems of the motor vehicle or be encompassed by a system which provides further control and check functions for the motor vehicle.

The driveaway assistance system 1 comprises a control device 2, which via an interface 4 controls braking equipment 6 of a motor vehicle. For control of the braking equipment 6, the control device 2 by means of a plurality of devices, which are described below, detects the current operating condition of the motor vehicle and on the basis of data supplied by these devices determines an operating condition for the motor vehicle, into which operating condition the motor vehicle is to be brought under the control of a vehicle driver.

A sensor device 8 is connected to an ignition system 10 of the motor vehicle, to sensors 12 for detecting open and closed positions of vehicle doors and to a safety device 14, which is used to recognize the occupation of vehicle seats and current operating conditions of protection devices for vehicle occupants (e.g., airbags, seat belt systems).

A sensor device 16 for recognizing positions and/or movements of an accelerator pedal 18 is connected to the latter and, if provided, to an accelerator pedal switch 20, which checks whether the vehicle driver is contacting or actuating the accelerator pedal 18.

In a comparable manner a sensor device 22 is connected to a brake pedal 24 and, if provided, to a brake pedal switch 26 in order to determine positions and/or movements as well as actuation of the brake pedal 27. By means of a sensor device 28 a current actuating state of a clutch pedal 30 and optionally of a clutch pedal switch 32 is detected.

To ascertain whether a gear is selected and which gear is selected, a sensor device 34 is connected to a transmission 36. A sensor device 38 is used to acquire parameters which characterize the current operating state of an engine 40.

The control device 2 is further connected to a temperature sensor 42 for detecting the ambient temperature, a velocity sensor 44 for detecting the current vehicle velocity, a vehicle inclination sensor 46 for detecting the current inclination of the motor vehicle in longitudinal direction of the latter, sensors 48 for detecting the rotational speeds of one or more vehicle wheels, and a weight sensor 50 for detecting a current vehicle weight. The control device 2 moreover via a brake sensor device 52 detects the current operating state of the braking equipment 6.

Via an interface 54 the control device 2 receives data, which are provided by further components (not shown) of the motor vehicle and supply, in addition to the previously described performance quantities, further information about the state of the vehicle. Examples thereof are data, which characterize correct and/or defective operating conditions of a vehicle engine management system, an anti-skid system (ABS) and traction and stability control systems (e.g., ESP, ASR, ASD) and indicate the tire air pressure of one or more tires and available quantities of operating substances (e.g., gear oil, engine oil). It is further possible via the interface 54 to detect whether the motor vehicle is connected to a towed vehicle (e.g., a caravan) and to detect parameters characterizing the current operating state of the towed vehicle.

The driveaway assistance system 1 is suitable for vehicles having conventional shift transmissions, automatic transmissions and semi-automatic transmissions. Given use of the system 1 in conjunction with an automatic or semi-automatic transmission, as opposed to use with a shift transmission, the sensor device 28 is connected to a clutch switch (not shown) instead of to the clutch pedal switch 32. Connection of the sensor device 28 to a clutch pedal is not possible in such cases.

Operation of the driveaway assistance system 1 in a motor vehicle having a conventional shift transmission is described with reference to the flowchart shown in FIGS. 2A-2C.

As explained initially, in the standstill condition of the motor vehicle the braking equipment 6 independently and automatically generates braking forces which are needed to keep the motor vehicle in the standstill condition. Accordingly, upon driveaway of the motor vehicle, i.e., upon a transition from the standstill condition to a driving condition, the braking forces generated in the standstill condition have to be reduced.

In step 101, it is checked whether the braking equipment 6 is generating braking forces to keep the motor vehicle in the standstill condition. If it is ascertained here that the braking equipment 6 has not been activated, i.e., is not generating immobilizing braking forces, which is attributable e.g., to a defective operating state of the braking equipment 6 or manual deactivation of the braking equipment 6 by a vehicle driver, the steps described below for reducing braking forces generated by the braking equipment 6 are not necessary. Accordingly, at this point the method (the program flow) for control of the system is terminated.

The method likewise terminates if it is ascertained in step 102 that the ignition system 10 is not switched on, if in step 103 the velocity sensor 44 detects a vehicle velocity, or if it is ascertained in step 104 that the clutch pedal 30 and/or, if provided, the clutch pedal switch 32 has not been actuated.

In step 102, it is checked whether the ignition system 10 is switched on. In this case, it may be checked whether the ignition system 10 has effected a start of the engine 40, i.e., the engine 40 is running, or whether the ignition system 10, e.g., because of a detected ignition key position, is in a state which allows starting of the engine 40. The last case of checking the ignition system 10 is adequate particularly for motor vehicles, in which the engine 40 is automatically stopped in the standstill condition and automatically started, e.g., through actuation of the accelerator pedal 18, when the ignition key is in an appropriate position.

If it is ascertained in steps 102 and 103 that the ignition system 10 is switched on and the motor vehicle has zero velocity, a check is made in step 104 for the actuation of a clutch (not shown) necessary for driveaway of a motor vehicle having a shift transmission. If the check is likewise successfully concluded, the basic preconditions for control of the braking equipment 6 to assist driveaway are met. In the steps described below, current operating conditions, and operating conditions for the motor vehicle requested by the vehicle driver, are determined in order to control the braking equipment 6 accordingly during driveaway of the motor vehicle.

In step 105, the state of the accelerator pedal 18 and, if provided, of the accelerator pedal switch 20 is checked. If it is ascertained here that the accelerator pedal 18 has been moved out of its neutral position (and, optionally, the accelerator pedal switch 20 indicates an accelerator pedal operation), the control system moves on to 106. It is further provided that in step 105 the nature of the movement of the accelerator pedal out of its neutral position, i.e., the speed at which the accelerator pedal is moved out of the neutral position, is determined. Detection of the accelerator pedal, movement, which characterizes the manner in which the vehicle driver would like to start, may then be used to control the reduction of the braking forces generated by the braking equipment 6 in the standstill condition in a corresponding manner, provided further conditions described below are met. In the event of an unsuccessful check in step 105, the control system goes back to step 101.

In step 106 the transmission ratio of the transmission 36 is determined in order to ascertain its suitability for driveaway of the motor vehicle. Usually the check is successfully concluded when the transmission ratio of the transmission 36 indicates that first gear or reverse gear has been selected. Advantageously, a transmission ratio for second gear should also lead to a successful check because, particularly in the case of a road surface quality having low friction (e.g., snow-covered roads, black ice), second gear is frequently used for starting up.

In step 107 the current engine speed and the current engine torque are determined. Here, it is checked whether the current engine speed is higher than the idling speed defined for the engine 40, whether the current engine torque is higher than a defined engine torque during no-load operation, and whether the engine torque requested by the vehicle driver through actuation of the accelerator pedal 18 is equal to or greater than the current engine torque.

For the comparison of the current engine speed with the defined idling speed, it is advantageous if the temperature sensor 42 detects the ambient temperature in order to take account of temperature-dependent influences upon the engine speed. Thus, in the event of low external temperatures which generally lead to an increased idling speed, it is possible for checking of the current engine speed to be effected accordingly. Here, in a comparable manner to step 105, the increase of the engine torque may also be determined in order to ascertain whether the increase is equal to or greater than zero. As with the detection of accelerator pedal movements, the engine torque increase may be used during the reduction of the immobilizing braking forces of the braking equipment 6.

If the conditions which are necessary for recognizing the driveaway request of the vehicle driver are met, then in the following steps parameters/quantities characterizing the current operating state of the motor vehicle are checked.

In step 108 the current engine torque is compared with a value, which reflects the engine torque defined for no-load operation and correction factors. During the comparison the current engine torque is checked to ascertain whether it is actually sufficient for driveaway of the vehicle from the standstill condition. To this end, the vehicle inclination sensor 46 determines whether the motor vehicle is situated on an ascending or descending gradient, wherein optionally by means of the weight sensor 50 the current vehicle weight and/or via the interface 52 the weight of a towed vehicle connected to the motor vehicle may be ascertained. On the basis of this information, the correction factors are calculated.

After a successful check in step 108, in step 109 it is determined whether the current engine torque or the engine torque requested by the vehicle driver is increasing.

If this is the case, in step 110 it is checked whether the clutch (not shown) of the motor vehicle is in a state which enables power transmission from the engine 40 to the wheels. For this purpose a time-averaged increase of the engine torque is detected, wherein the check is concluded successfully when the average torque increase during a defined period of time (e.g., around 4 milliseconds) lies within a defined range; e.g., is between 1% and 60%.

As an alternative to steps 108, 109 and 110, it is provided that in step 111 a check is made whether the inclination detected by the vehicle inclination sensor 46 has changed by a defined amount relative to the vehicle inclination existing after steps 104 to 107 (i.e., after recognition of the driveaway request). Thus, for example, the check in step 111 is successfully concluded when the inclination detected here has increased by 5% relative to the inclination of the motor vehicle upon recognition of the driveaway request.

Alternatively in step 11, instead of the inclination, the current change of inclination may be compared with changes of inclination in steps 104 to 107.

Whereas in steps 108, 109 and 110 the reaction of the engine 40 to biting of the clutch, i.e., the gradient change of the engine speed curve, with a simultaneous increase of the engine torque is recognized, in step 111 a "dipping" of the motor vehicle, which is typical of driveaway, is determined. As is indicated in FIGS. 2A-2C by the dashed lines, step 111, instead of replacing steps 108, 109 and 110, may be effected after these steps.

In an optional step 112 further parameters/quantities may be acquired, which indicate whether the motor vehicle may or should actually be moved out of the standstill condition. An obstacle to driveaway of the motor vehicle is, for example, detection by the sensor device 22 of an actuation of the brake pedal 24 and/or of the brake pedal switch 26. Data provided via the interface 54 may also reflect such operating conditions. Thus, for example, the motor vehicle should not be started up if the engine management system, the anti-skid system or traction and stability control systems are not operating correctly, if one of the tires has insufficient air pressure or no air pressure at all, if operating substances fall below the minimum quantities needed to operate the motor vehicle, and the like.

Here, moreover, the state of the sensors 12 for vehicle switches and of the safety device 14 may be checked, wherein a driveaway is admissible when all doors are closed and the seat belt systems of the occupied seats are activated. In this case, it should however be noted that driveaway of the motor vehicle is desirable also with open vehicle doors when, for example, the driver door has been opened for maneuvering into a parking space or bulky articles are transported with the boot lid open. The checking of seat belt systems may also lead to undesirable prevention of starting if, for example, an article is situated on a seat and activates the seat occupation recognition.

A further factor to be considered in respect of step 112 is that the checks, which may be effected there, may be effected by other control and monitoring devices of the motor vehicle.

Once steps 101 to 112 have been successfully completed in one of the described sequences, in step 113 via the interface 4 the braking equipment 6 is controlled by the control device 2 in such a way that the braking forces generated in the standstill condition are reduced, advantageously in dependence upon parameters/quantities acquired in the preceding steps.

Operation of the driveaway control system 1 in the case of an automatic or semi-automatic transmission is described with reference to FIGS. 3A-3C.

Figure 2A:
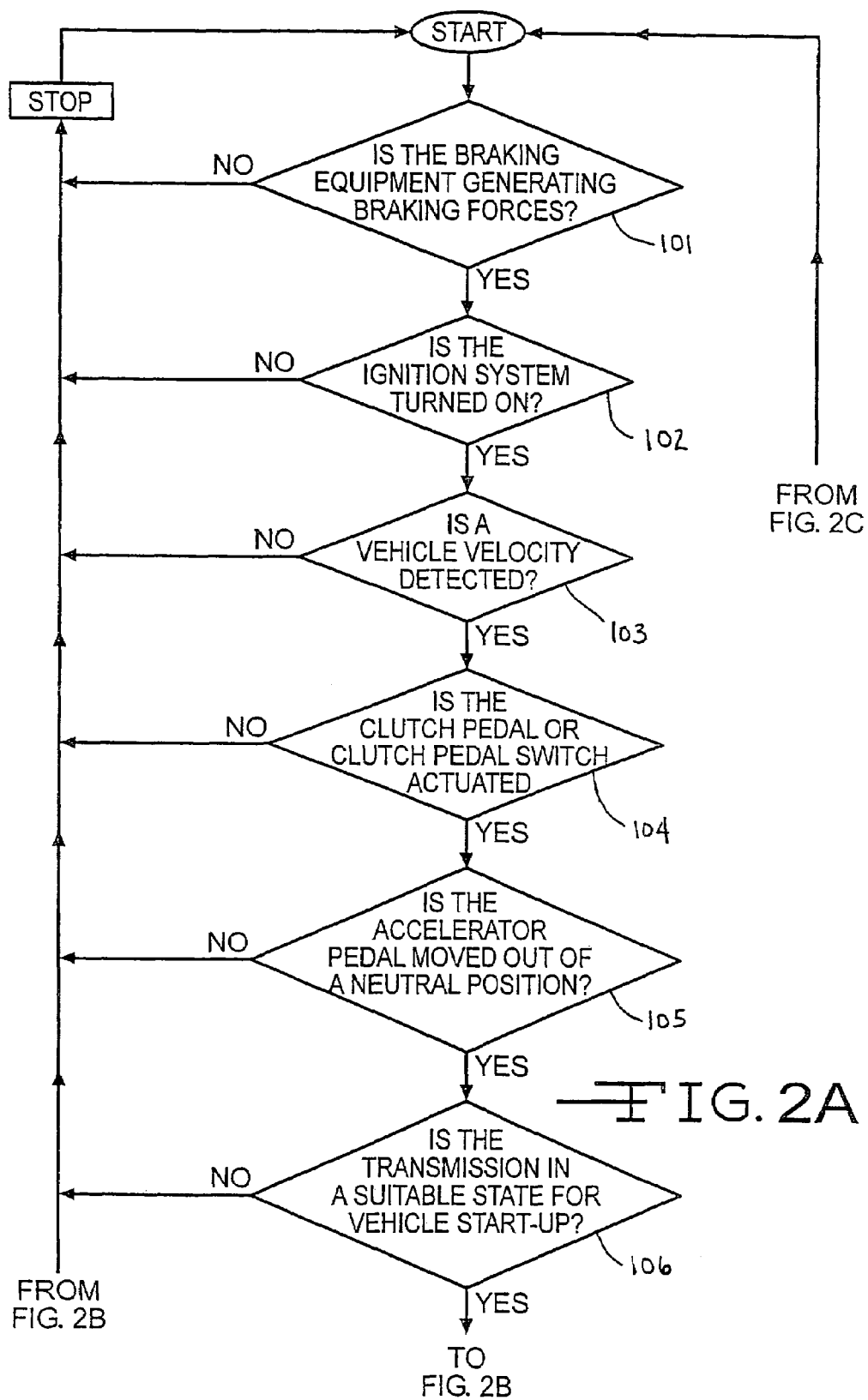
Figure 2B:
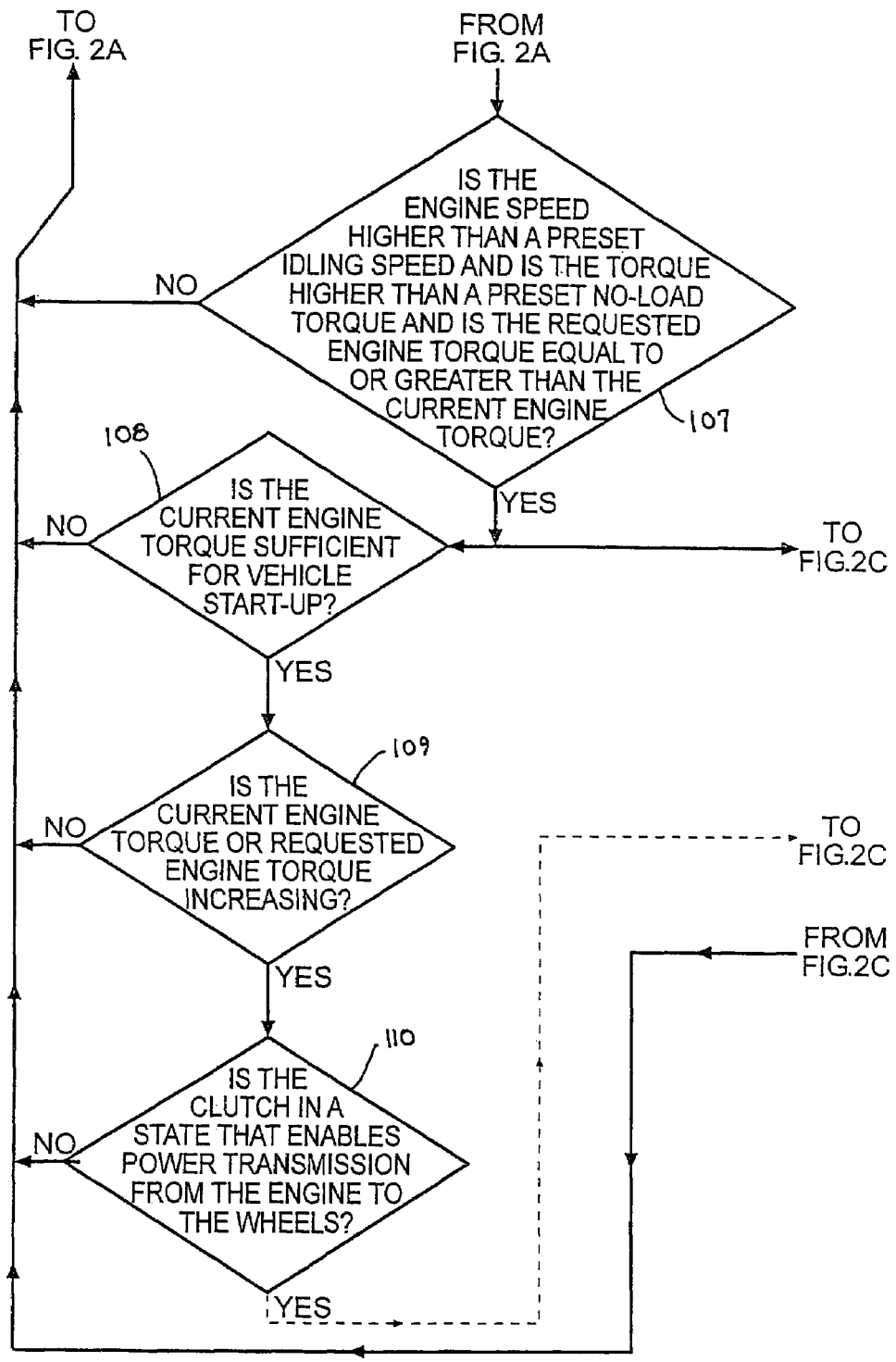
Figure 2C:
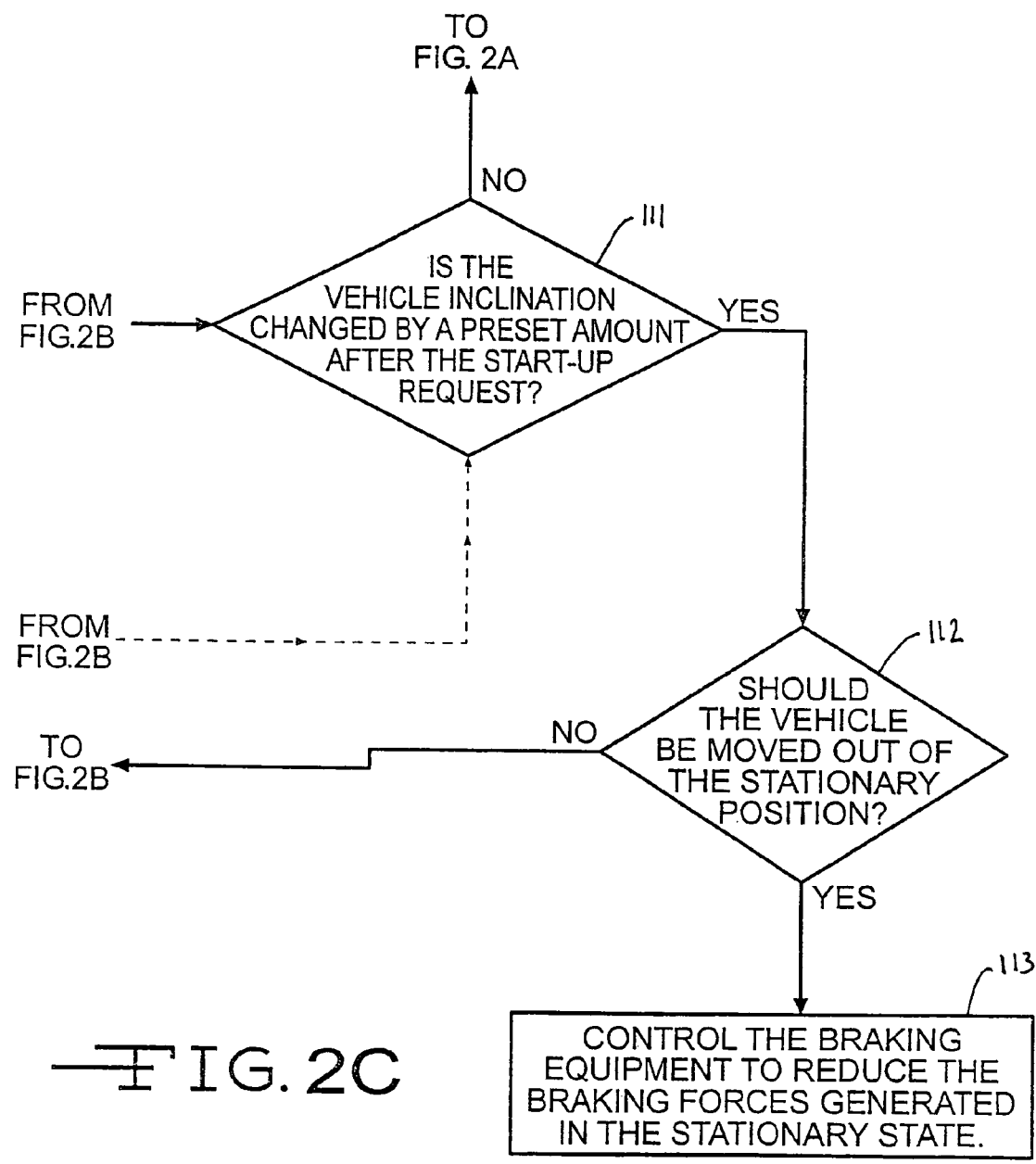
Figure 3B:
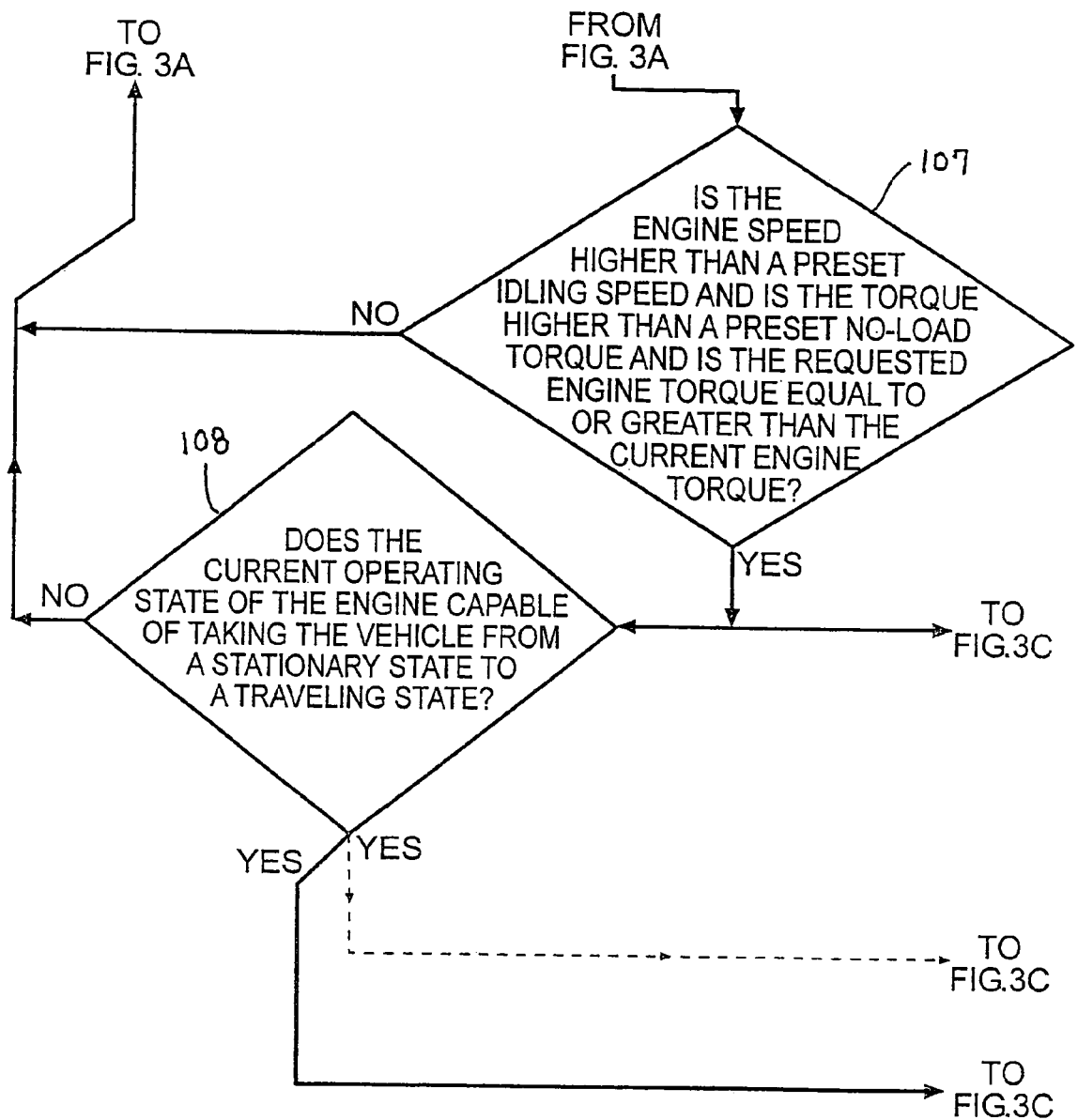

Of the steps used to check the basic requirements for operation of the system 1, steps 101, 102 and 103 of FIGS. 3A-3C correspond to steps 101, 102 and 103 according to FIGS. 2A-2C. In step 104 of FIGS. 3A-3C, on the other hand, a clutch switch (not shown) is checked.

Steps 105, 106 and 107 for recognition of a driveaway request of a vehicle driver correspond, here, to the steps 105, 106 and 107 described in connection with a shift transmission.

Because of the mode of operation of an automatic or semi-automatic transmission, in such cases steps 109 and 110 according to FIGS. 2A-2C are omitted from control of the system 1. Consequently, during operation of the system 1 according to FIGS. 3A-3C step 108 is implemented, which checks whether the current operating state of the engine 40 is actually capable of bringing the motor vehicle from a standstill condition to a driving condition. In this case, the implementation of step 108 of FIGS. 3A-3C corresponds to that of step 108 according to FIGS. 2A-2C.

The reason for this procedure is that, in the case of an automatic or semi-automatic transmission, a transfer function is awaited, which describes the relationship between positions and/or movements of the accelerator pedal and the driving wheels. This transfer function is achieved when, according to step 108, the engine torque required for driveaway of the motor vehicle has been reached.

Here too, in a comparable manner to operation of the system 1 according to FIGS. 2A-2C, optional or additional implementation of the previously described step 111 is provided.

The previously described optional step 112 may then be implemented. Then in step 113, as described above, the braking equipment 6 is controlled so as to enable driveaway of the motor vehicle, provided that the previously implemented steps have been successfully concluded.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is a:

1. Method of assisting the driveaway of a motor vehicle having a braking equipment in a standstill condition, comprising the following steps:
    determination of driveaway parameters characterizing an operating condition of the motor vehicle in which the motor vehicle is to be brought from into a driving condition;
    determination of current operating conditions of the motor vehicle until an operating condition is determined in which a current inclination of the motor vehicle has varied by a defined value relative to an inclination of the motor vehicle in the standstill condition, thereby indicating an active connection between an engine and driving wheels of the motor vehicle, and
    control of braking equipment which is activated in the standstill condition so as to reduce braking forces generated in the standstill condition in order to allow driveaway of the motor vehicle.

2. Method according to claim 1, comprising the following steps:
    creating a definition, for the standstill condition, of an initial operating condition which has to exist prior to the determination of the driveaway parameters, and
    determination of current operating conditions of the motor vehicle in the standstill condition until an operating condition is determined which corresponds to the initial operating condition.

3. Method according to claim 2, wherein
    when defining the initial operating state, an operating condition is defined by at least one of an ignition system being activated, the vehicle velocity equaling zero, and the braking equipment generating braking forces.

4. Method according to claim 2, wherein
    when defining the initial operating condition, an operating condition is defined by at least one of a clutch pedal, a clutch pedal switch, and a clutch switch having been operated.

5. Method according to claim 1, wherein determination of the driveaway parameters includes determining that at least one of:
    an accelerator pedal has been actuated;
    a current rotational speed of the engine is higher than a defined rotational speed of the engine during no-load operation;
    a requested engine torque is higher than a current engine torque; and
    the current engine torque is higher than an idling torque defined for no-load operation of the engine.

6. Method according to claim 1, wherein determination of the driveaway parameters includes determining that at least one of an accelerator pedal switch has been actuated, an accelerator pedal has been dynamically actuated, and a current change of the engine torque is greater than zero.

7. Method according to claim 1, wherein determination of the driveaway parameters is effected until at least one of the driveaway parameters characterizes an operating condition which differs from the operating condition of the motor vehicle in the standstill condition.

8. Method according to claim 1, wherein when determining current operating conditions, at least one of a current engine torque, a current change of the engine torque, a change of a requested engine torque, and a time-averaged change of a current engine torque is determined.

9. Method according to claim 8, wherein the determination of operating conditions is effected until the current engine torque is at least one of:
   higher than a combination of an engine torque, which is defined for no-load operation of the engine, and a correction factor;
   the current change of the engine torque is greater than zero;
   the current change of the requested engine torque is greater than zero; and
   the current time-averaged change of the engine torque during a defined period of time lies within a defined range.

10. Method according to claim 1, wherein control of the braking equipment is effected in response to at least one of:
   an operating condition of the braking equipment in the standstill condition;
   the determined driveaway parameters;
   the determined current operating condition; and
   a current operating condition during control of the braking equipment.

11. Method according to claim 1, wherein during control of the braking equipment the current operating condition of the motor vehicle is controlled in response to at least one of:
   an operating condition of the braking equipment in the standstill condition;
   the detected driveaway parameters;
   the detected current operating condition; and
   a current operating condition when controlling the braking equipment.

12. Method according to claim 11, wherein
   during control of the braking equipment at least one of a current speed and a current torque of the engine is controlled.

13. System for assisting the driveaway of a motor vehicle having a braking equipment that is activated in the standstill condition, comprising:
   a control device; and detection devices for
   the determination of driveaway parameters characterizing an operating condition of the motor vehicle in which the motor vehicle is to be brought from a standstill condition into a driving state, and for
   the determination of parameters characterizing current operating condition of the motor vehicle, and the for
   the control device for controlling the braking equipment, which is activated in the standstill condition so as to reduce braking forces generated in the standstill condition in order to allow a driveaway of the vehicle, and for
   an interface for control of the braking equipment for determination of current operating conditions of the motor vehicle until a determination is made of an operating condition in which a current inclination of the motor vehicle has varied by a defined value relative to an inclination of the motor vehicle in the standstill condition, thus indicating an active connection between an engine and driving wheels of the motor vehicle.

14. Computer readable recording medium comprising a computer program product having program code portions for carrying out the steps of:
   determination of driveaway parameters characterizing an operating condition of the motor vehicle in which the motor vehicle is to be brought from a standstill condition into a driving condition;
   determination of current operating conditions of the motor vehicle until an operating condition is determined which is occasioned by an active connection between an engine and driving wheels of the motor vehicle as indicated by detection of a current inclination of the motor vehicle that has varied by a defined value relative to an inclination of the motor vehicle in the standstill condition; and
   control of braking equipment which is activated in the standstill condition so as to reduce braking forces generated in the standstill condition in order to allow driveaway of the motor vehicle.

15. Method of assisting the driveaway of a motor vehicle having a braking equipment which is activated in the standstill condition, comprising the following steps:
   determination of driveaway parameters characterizing an operating condition of the motor vehicle in which the motor vehicle is to be brought from a standstill condition into a driving condition;
   determination of current operating conditions of the motor vehicle until an operating condition is determined which is caused by an active connection between an engine and driving wheels of the motor vehicle as indicated by a current inclination change of the motor vehicle reaching a predetermined value; and
   control of braking equipment which is activated in the standstill condition so as to reduce braking forces generated in the standstill condition in order to allow driveaway of the motor vehicle.

16. Method according to claim 15, comprising the following steps:
   creating a definition, for the standstill condition, of an initial operating condition which has to exist prior to the determination of the driveaway parameters, and
   determination of current operating conditions of the motor vehicle in the standstill condition until an operating condition is determined which corresponds to the initial operating condition.

17. Method according to claim 16, wherein
   when defining the initial operating condition, an operating condition is defined by at least one of an ignition system being activated, the vehicle velocity equaling zero, and the braking equipment generating braking forces.

18. Method according to claim 16, wherein when defining the initial operating condition, an operating condition is defined by at least one of a clutch pedal, a clutch pedal switch, and a clutch switch having been operated.

19. Method according to claim 15, wherein determination of the driveaway parameters includes determining that at least one of:
   an accelerator pedal has been actuated;
   a current rotational speed of the engine is higher than a defined rotational speed of the engine during no-load operation;
   a requested engine torque is higher than a current engine torque; and the current engine torque is higher than an idling torque defined for no-load operation of the engine.

20. Method according to claim 15, wherein determination of the driveaway parameters includes determining that at least one of an accelerator pedal switch has been actuated, an accelerator pedal has been dynamically actuated, and a current change of the engine torque is greater than zero.

21. Method according to claim 15, wherein determination of the driveaway parameters is effected until at least one of the driveaway parameters characterizes an operating condition which differs from the operating state of the motor vehicle in the standstill condition.

22. Method according to claim 15, wherein when determining current operating conditions, at least one of a current engine torque, a current change of the engine torque, a change of a requested engine torque, and a time-averaged change of a current engine torque is determined.

23. Method according to claim 22, wherein the determination of operating conditions is effected until the current engine torque is at least one of:
   higher than a combination of an engine torque, which is defined for no-load operation of the engine, and a correction factor;
   the current change of the engine torque is greater than zero;
   the current change of the requested engine torque is greater than zero; and
   the current time-averaged change of the engine torque during a defined period of time lies within a defined range.

24. Method according to claim 15, wherein control of the braking equipment is effected in response to at least one of:
   an operating condition of the braking equipment in the standstill condition;
   the determined driveaway parameters;
   the determined current operating condition; and
   a current operating condition during control of the braking equipment.

25. Method according to claim 15, wherein during control of the braking equipment the current operating condition of the motor vehicle is controlled in response to at least one of:
   an operating condition of the braking equipment in the standstill condition;
   the detected driveaway parameters;
   the detected current operating condition; and
   a current operating condition when controlling the braking equipment.

26. Method according to claim 25, wherein during control of the braking equipment at least one of a current speed and a current torque of the engine is controlled.

27. System for assisting the driveaway of a motor vehicle having a braking equipment that is activated in the standstill condition, comprising:
   a control device; and detection devices for
   the determination of driveaway parameters characterizing an operating condition of the motor vehicle in which the motor vehicle is to be brought from a standstill condition into a driving state, and for
   the determination of parameters characterizing current operating conditions of the motor vehicle, and for
   the control device for controlling the braking equipment, which is activated in the standstill condition so as to reduce braking forces generated in the standstill condition in order to allow a driveaway of the vehicle, and for
   an interface for control of the braking equipment for determination of current operating conditions of the motor vehicle until an operating condition is determined which is caused by an active connection between an engine and driving wheels of the motor vehicle as indicated by a current inclination of the motor vehicle having varied by a defined value relative to an inclination of the motor vehicle in the standstill condition.

28. Computer readable recording medium comprising a computer program product having program code portions for carrying out the steps of:
   determination of driveaway parameters characterizing an operating condition of the motor vehicle in which the motor vehicle is to be brought from a standstill condition into a driving condition;
   determination of current operating conditions of the motor vehicle until an operating condition is determined which is caused by an active connection between an engine and driving wheels of the motor vehicle wherein the active connection of the engine and the driving wheels is indicated by a current inclination of the vehicle reaching a predetermined value; and
   control of braking equipment which is activated in the standstill condition so as to reduce braking forces generated in the standstill condition in order to allow driveaway of the motor vehicle.

29. Computer readable recording device comprising a computer program product having program code portions for carrying out the steps of:
   determination of starting parameters characterizing an operating condition of the motor vehicle in which the motor vehicle is to be brought from a standstill condition into a driving condition;
   determination of current operating conditions of the motor vehicle until an operating condition is determined in which a current inclination of the motor vehicle has varied by a defined value relative to an inclination of the motor vehicle in the standstill condition and which is occasioned by an active connection between an engine and driving wheels of the motor vehicle; and
   control of braking equipment which is activated in the standstill condition so as to reduce braking forces generated in the standstill condition in order to allow driveaway of the motor vehicle.

30. Computer readable recording device comprising a computer program product having program code portions for carrying out the steps of:
   determination of driveaway parameters characterizing an operating condition of the motor vehicle in which the motor vehicle is to be brought from a standstill condition into a driving condition;
   determination of current operating conditions of the motor vehicle until an operating condition is determined in which a current inclination of the motor vehicle reaches a predetermined value indicating an active connection between an engine and driving wheels of the motor vehicle; and
   control of braking equipment which is activated in the standstill condition so as to reduce braking forces generated in the standstill condition in order to allow driveaway of the motor vehicle.

\* \* \* \* \*